(12) United States Patent
Isaacs et al.

(10) Patent No.: US 8,548,155 B2
(45) Date of Patent: Oct. 1, 2013

(54) DYNAMIC MESSAGE CONTEXT DRIVEN APPLICATION ASSEMBLY FOR CUSTOMER SERVICE AGENT PRODUCTIVITY APPLICATIONS

(75) Inventors: Charlie Isaacs, San Jose, CA (US);
Vikas Nehru, San Jose, CA (US);
Dilpreet Singh, Redwood City, CA (US)

(73) Assignee: Kana Software, Inc., Sunnyvale, CA (US)

( * ) Notice: Subject to any disclaimer, the term of this patent is extended or adjusted under 35 U.S.C. 154(b) by 0 days.

(21) Appl. No.: 13/447,355

(22) Filed: Apr. 16, 2012

(65) Prior Publication Data
US 2012/0263292 A1      Oct. 18, 2012

Related U.S. Application Data

(62) Division of application No. 11/469,173, filed on Aug. 31, 2006, now Pat. No. 8,160,232.

(51) Int. Cl.
*H04M 3/00*    (2006.01)
(52) U.S. Cl.
USPC ............ 379/265.01; 379/265.11; 379/265.13; 379/266.02; 379/266.07
(58) Field of Classification Search
USPC .................. 379/88.18, 88.22, 88.17, 265.01, 379/265.09, 265.11, 265.13, 266.02, 266.07
See application file for complete search history.

(56) References Cited

U.S. PATENT DOCUMENTS

| | | | |
|---|---|---|---|
| 7,139,370 B1* | 11/2006 | Tse | 379/88.17 |
| 2004/0210639 A1* | 10/2004 | Ben-Yoseph et al. | 709/206 |
| 2005/0198173 A1* | 9/2005 | Evans | 709/206 |
| 2005/0232402 A1* | 10/2005 | Greve | 379/88.22 |
| 2006/0153347 A1* | 7/2006 | Clark et al. | 379/88.18 |
| 2006/0251238 A1* | 11/2006 | Richartz et al. | 379/265.12 |

* cited by examiner

*Primary Examiner* — Joseph J Nguyen
(74) *Attorney, Agent, or Firm* — Steven M. Greenberg, Esq.; Carey Rodriguez Greenberg O'Keefe LLP

(57) ABSTRACT

Embodiments of the present invention address deficiencies of the art in respect to message response systems for customer service environments and provide a method, system and computer program product for dynamic message context driven application assembly in a customer service agent productivity suite of applications. In one embodiment of the invention, a message context driven application assembly method for a customer service agent productivity suite can be provided. The method can include determining a context of an inbound message in a message list of an agent user interface for the customer service agent productivity suite; selecting at least one application based upon the determined context; providing an activatable reference to the at least one application in the agent user interface; and, displaying the agent user interface to provide access to the at least one application through the activatable reference.

9 Claims, 2 Drawing Sheets

DYNAMIC MESSAGE CONTEXT DRIVEN APPLICATION ASSEMBLY FOR CUSTOMER SERVICE AGENT PRODUCTIVITY APPLICATIONS

CROSS-REFERENCE TO RELATED APPLICATIONS

This application is a Divisional of U.S. application Ser. No. 11/469,173, filed Aug. 31, 2006, now U.S. Pat. No. 8,160,232, entitled "DYNAMIC MESSAGE CONTEXT DRIVEN APPLICATION ASSEMBLY FOR CUSTOMER SERVICE AGENT PRODUCTIVITY APPLICATIONS," the entirety of which is incorporated herein by reference.

BACKGROUND OF THE INVENTION

1. Field of the Invention

The present invention relates to the field of customer service agent productivity applications and more particularly to message response aids for customer service agent productivity applications.

2. Description of the Related Art

A customer service agent productivity suite of applications refers to an electronic suite of computing applications arranged to support the daily responsibilities of a customer service representative (CSR) in a customer service environment such as a call center. The customer service environment is a customer-facing component of a company and provides support for customers utilizing the products and services of the company. Generally, the success of a customer service environment relates directly to the speed in which a response can be provided to the customer and the pertinence of the response to the customer inquiry. To that end, the efficient operation of the customer service environment can be integral to the success of the company.

Historically, the customer service environment included a call center of CSRs that ranged from just a few CSR agents answering customer telephone calls on a first come first served basis whilst providing responses to inquiries off the cuff, to sophisticated, stand-alone call center facilities employing hundreds if not thousands of CSRs either centrally, or in a distributed manner. In the latter circumstance, CSRs can be provided call scripts outlining proposed, "canned" responses to common customer inquiries. Over the past ten years, it has even become common to route customer calls overseas to foreign jurisdictions where CSR centers employ hundreds of CSRs, each providing customer support via pre-programmed script without customers becoming aware of the vast distance between customer and CSR.

Live customer assistance provided by a CSR can be expensive for many organizations, yet, many customer inquiries are so routine and predictable that live human intervention is not always required. As such, in many cases, responses to customer inquiries can be automated, for example through well-known interactive voice response (IVR) systems. Just as companies often prefer to handle customer service inquiries in an automated, passive way to avoid the expense of employing a multiplicity of CSRs, customers often prefer a passive mode of obtaining customer service. For those customers preferring a passive mode of obtaining customer service, message based customer service has become a desirable tool—particularly the use of e-mail based customer service inquiries.

Message response systems form an integral part of the customer service agent productivity suite so as to efficiently handle inbound, message based customer service inquiries. In a message response system, customers forward messages, such as e-mail messages, instant messages and Web form submission messages, to a designated address in a customer service organization of a company. The message response system minimally can route the inbound message to a particular CSR for handling by the CSR, and in many cases, the message response system can automatically provide a response message by parsing the content of the inbound message and locating a suitable response based upon a set of response rules for the message response system.

Sophisticated message response systems integrate a multiplicity of information management applications to assist the CSR in responding to an inquiry message by a customer. Exemplary information management applications include order processing systems, customer relationship management systems, enterprise resource planning applications, contact management systems and the like. Ordinarily, the CSR must pick and choose relevant information management applications through a client terminal of a computing system utilized by the CSR in order to locate enough information to properly and effectively respond to an inquiry message. Yet, to do so can be error prone and time consuming, often requiring more than a dozen mouse clicks to locate important information sought by the customer.

BRIEF SUMMARY OF THE INVENTION

Embodiments of the present invention address deficiencies of the art in respect to message response systems for customer service environments and provide a novel and non-obvious method, system and computer program product for dynamic message context driven application assembly in a customer service agent productivity suite of applications. In one embodiment of the invention, a dynamic message context driven application assembly method for a customer service agent productivity suite can be provided. The method can include dynamically determining a context of an inbound message in a message list of an agent user interface for the customer service agent productivity suite; selecting at least one application based upon the determined context; providing an activatable reference to the at least one application in the agent user interface; and, displaying the agent user interface to provide access to the at least one application through the activatable reference. In an aspect of the embodiment, the method further can include passing the context of the inbound message as input to the at least one application; receiving a view of the at least one application, the view including output responsive to the input, and rendering the view of the at least one application in the agent user interface.

In another embodiment of the invention, a message response data processing system can be provided. The system can include a customer service agent productivity suite of applications; a messaging client coupled to the productivity suite; an agent interface to the customer service agent productivity suite; and, dynamic context driven application assembly logic. The dynamic context driven application assembly logic can include program code enabled to dynamically determine a context of an inbound message in a message list of the messaging client, to select a set of applications based upon the determined context, and to provide an activatable reference for each application in the set of applications in the agent user interface. In an aspect of the invention, the system further can include a list of rules coupled to the context driven application assembly logic, the list of rules base correlating context for inbound messages with different applications in the set of applications.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic message context driven application assembly in a customer service agent productivity suite of applications. In accordance with an embodiment of the present invention, the content of an inbound message can be parsed and the content can be processed according to a set of rules to identify one or more integrated applications. References to the identified applications can be aggregated in a user interface to the customer service agent productivity suite in order to provide an anticipated selection of pertinent applications useful in responding to the inbound inquiry. In this way, a CSR responding to the inbound message can provide a response quickly with pertinent information without first haphazardly guessing as to the relevant applications necessary to locate the pertinent information for a response.

Figure 1:
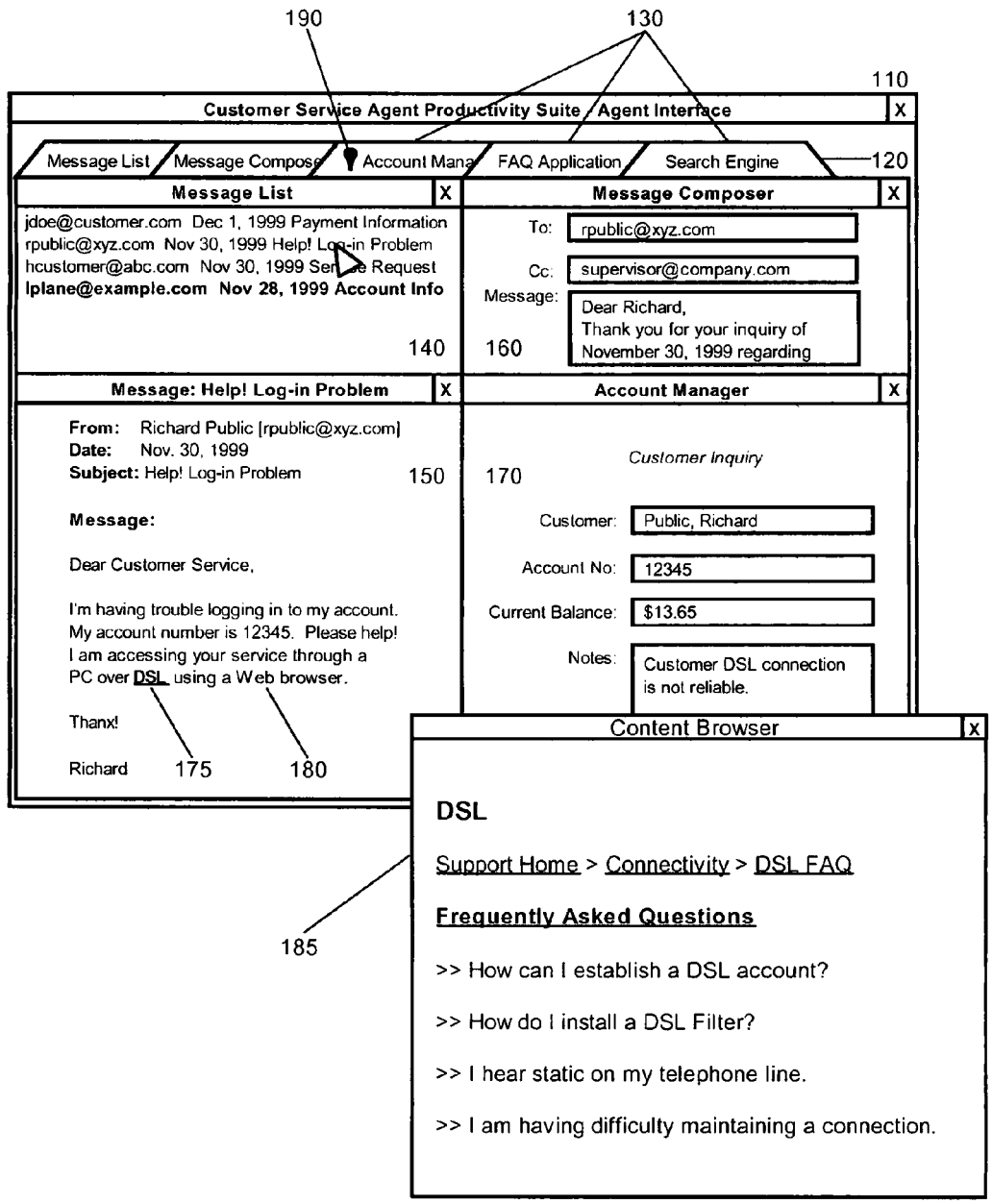
FIG. 1 is a pictorial illustration of a user interface for a customer service agent productivity suite of applications configured for message context driven application assembly.

In further illustration, FIG. 1 is a pictorial illustration of a user interface for a customer service agent productivity suite of applications configured for dynamic message context driven application assembly. As shown in FIG. 1, an agent user interface 110 to a customer agent productivity suite can be provided. The agent user interface 110 can provide a view for a CSR to a set of inbound messages from customers within a message list 140, along with a message view 150 for a selected inbound message in the message list 140. The agent user interface 110 also can provide a view to an outbound message to a customer in response to an inbound message in message composition view 160.

The agent user interface 110 also can provide a set of tabs 120, each of tabs referencing a corresponding application available for viewing through the agent user interface 110. The applications references through tabs 120 include both internal applications included as part of the customer service agent productivity suite, and also external applications provided separately from the customer service agent productivity suite. In the example shown in FIG. 1, internal applications include a message list, a message composer, customer account management application and a frequently asked questions (FAQ) application, while external applications include a search engine for searching Web content over the global Internet.

In accordance with an embodiment of the present invention, the content 180 of an inbound message can be processed to identify a selection of either or both internal and external applications to be referenced through the agent user interface 110. For example, as shown in FIG. 1, the content 180 of an inbound message can be processed to identify a selection of applications 130 to be referenced by a corresponding set of tabs 120. In this way, a CSR interacting with the agent user interface 110 automatically can be provided ease of access to a pertinent selection of applications for use in responding to the inbound message.

Additionally, portions of the content 180 of the inbound message can be used as seed input to one or more of the applications 130 referenced in the tabs 120. For instance, the account number shown in the content 180 of the inbound message of FIG. 1 can be used as a search parameter for an internal account manager application such that a view 170 to the account manager application automatically can include appropriate information in the context of the content 180 of the inbound message. Once the view 170 to the account manager application can been updated with the appropriate information in the context of the content 180 of the inbound message, the appearance of the tab 130 to the view 170 can be modified to draw attention to the updated rendering of the view 170 to the account manager application, for instance by inserting a "blinking" light bulb image 190 within the tab 130 to the view 170 to the account manager application. As a result, pertinent applications helpful in responding to the inbound message can be made available to the CSR without requiring the CSR to engage in guesswork regarding an appropriate mix of applications to be accessed to respond to the inbound message.

Yet further, a relevant term or phrase 175 in the content 180 can be detected and hyperlinked within the message view 150. The hyperlinked relevant term or phrase 175 in the content 180 can be configured to point to a Web page 185 disposed in a content server accessible from the agent user interface. By establishing a hyperlink between the relevant term or phrase 175 in the content 180, a CSR can quickly navigate to pertinent data associated with the relevant term or phrase 175 in the content 180 without engaging in a multiplicity of mouse clicks and keyboard search term entries in order to arrive at the Web page 185. In this way, the CSR can more rapidly respond to the inbound message.

Figure 2:
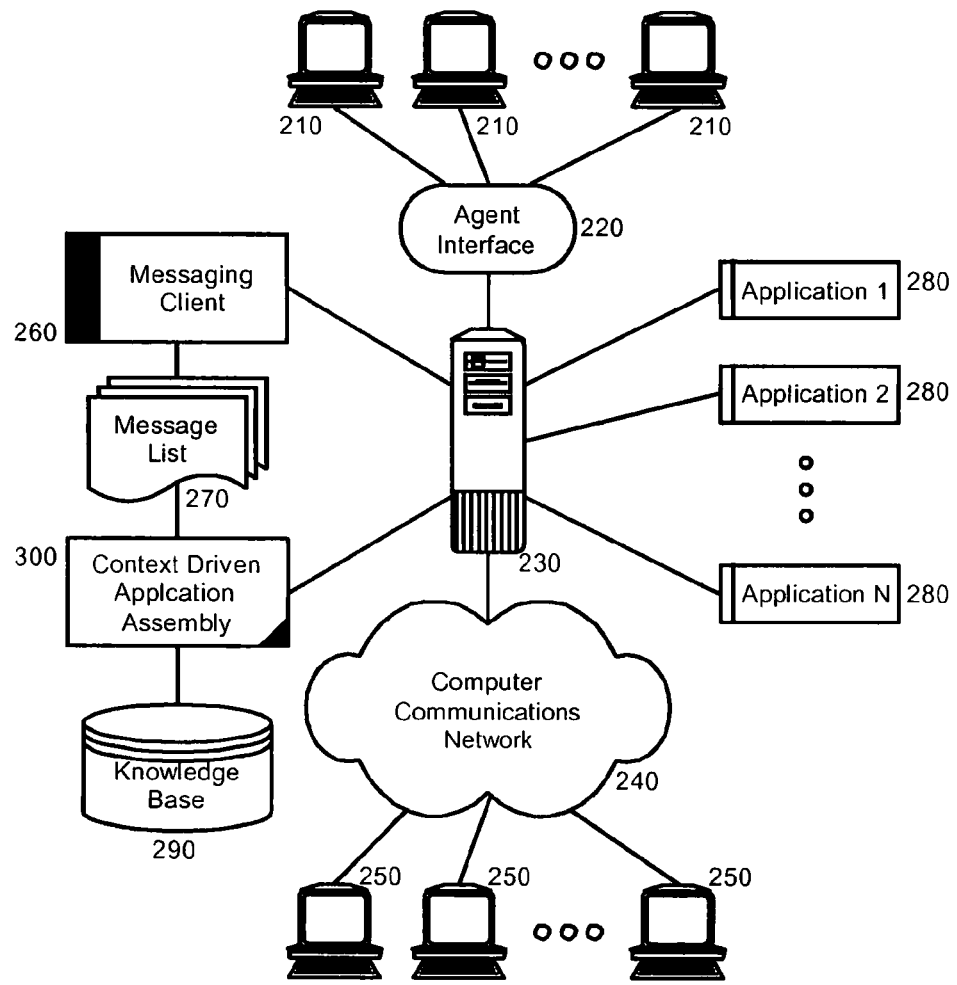
FIG. 2 is a schematic illustration of a customer service agent productivity data processing system configured for message context driven application assembly; and, FIG. 3 is a flow chart illustrating a process for message context driven application assembly in a customer service agent productivity suite of applications.

In yet further illustration, FIG. 2 is a schematic illustration of a customer service agent productivity data processing system configured for dynamic message context driven application assembly. The system can include a customer service agent productivity suite host server 230 providing a customer service agent interface 220 to a customer service agent productivity suite of applications 280 to CSR end-users 210. The customer service agent product suite host server 230 further can support a messaging client providing both inbound and outbound messaging services, including instant messaging and e-mail messaging, for the CSR end-users 210.

Notably, dynamic context driven application assembly logic 300 can be coupled to the customer service agent productivity suite host server 230. The dynamic context driven application assembly logic 300 can include program code enabled to parse the content of inbound messages in a message list 270 from different customers 250 over network 240 to determine the context of the inbound messages. The determined context for the inbound messages in the message list 270 can be processed against a list of rules 290 in order to determine a selection of the applications 280 to be rendered accessible through the agent interface 220. For instance, the rules in the list of rules can be applied to the textual content of an inbound message in the message list 270 to identify one or more of the applications 280 for which an activatable reference is to be provided through the agent interface 220.

Additionally, the program code of the dynamic context driven application assembly logic 300 can provide selected text of the textual content as input parameters to a selected one of the applications 280. As such, the selected one of the applications 280 can be automatically queried to provoke a view to pertinent information relating to the inbound message within a user interface for the selected one of the applications 280. Consequently, a CSR end user 210 interacting with the agent interface 220 can enjoy rapid access to pertinent information in order to respond to the inbound message in the message list 270.

Figure 3:
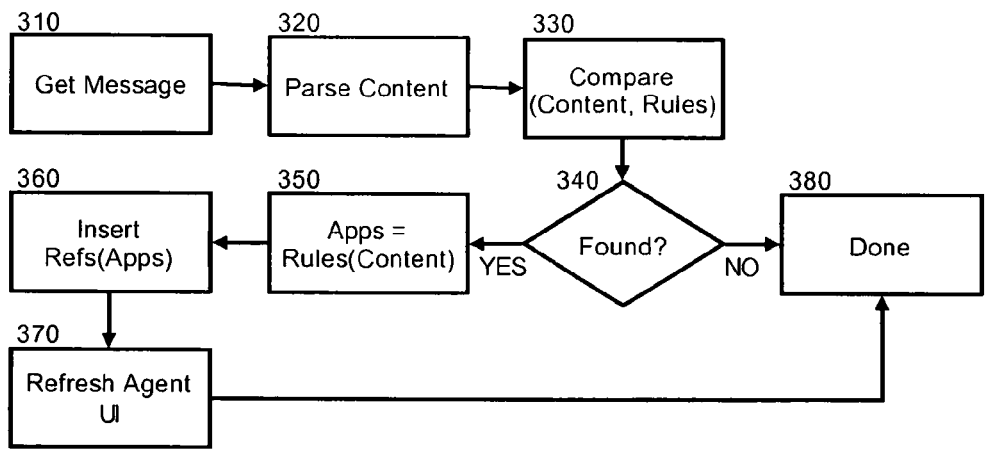

In even yet further illustration, FIG. 3 is a flow chart illustrating a process for dynamic message context driven application assembly in a customer service agent productivity suite of applications. The process can begin in block 310 in which a message from a message list can be retrieved for parsing. In block 320, the content of the message can be parsed to determine contextual elements of the message. In block 330, the parsed content can be applied to a list of rules in order to locate one or more rules pertaining to the context of the message. In decision block 340, if one or more rules in the list of rules cannot be located, the process can end in block 380. Otherwise, the process can continue through block 350.

In block 350, the located rule or rules can be applied to identify one or more applications—whether external to the customer service agent productivity suite of applications or internal to the customer service agent productivity suite of applications—to reference from within an agent user interface to the customer service agent productivity suite of applications. Thereafter, in block 360, corresponding references can be included in the agent user interface, for example within activatable tabs of a tab control for the agent user interface. Subsequently, the agent user interface can be refreshed such that an interacting CSR will be able to access the identified applications. Finally, in block 380 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A dynamic message context driven application assembly method for a customer service agent productivity suite, the method comprising:

dynamically determining a context of an inbound message in a message list of an agent user interface for the customer service agent productivity suite executing in memory of a computer, by parsing content for the inbound message to identify individual text of the inbound message, and providing the text to a list of rules to locate pertinent applications;

selecting at least one of the located pertinent applications that is internal to the customer service agent productivity suite or external to the customer service agent productivity suite;

providing an activatable reference to the at least one selected application in the agent user interface; and, displaying the agent user interface to provide access to the at least one selected application through the activatable reference.

2. The method of claim 1, wherein providing an activatable reference to the at least one selected application in the agent user interface, comprises providing an activatable tab for the at least one selected application in a tab control of the agent user interface.

3. The method of claim 1, further comprising:

identifying text within the inbound message;

formatting the identified text as a hyperlink pointing to a Web page related to the identified text; and, loading the Web page in a content browser.

4. A dynamic message response data processing system comprising:

a computer with at least one processor and memory;

a customer service agent productivity suite of applications;

a messaging client coupled to the productivity suite;

an agent interface to the customer service agent productivity suite;

dynamic context driven application assembly logic executing in the computer and comprising program code enabled to dynamically determine a context of an inbound message in a message list of the messaging client, to select a set of applications from a set of located pertinent applications, the set of applications includes both applications that are internal to the customer service agent productivity suite and also applications that are external to the customer service agent productivity suite, and to provide an activatable reference for each application in the set of applications in the agent user interface; and, a list of rules coupled to the context driven application assembly logic, the list of rules correlating context for inbound messages with different applications in the set of applications.

5. The system of claim 4, wherein each activatable reference for each application in the set of applications in the agent user interface, comprises an activatable tab in a tab control for the agent user interface.

6. A computer program product comprising a non-transitory computer usable medium having computer usable program code for dynamic message context driven application assembly for a customer service agent productivity suite, the computer program product including:
   computer usable program code for dynamically determining a context of an inbound message in a message list of an agent user interface for the customer service agent productivity suite executing in memory of a computer, by parsing content for the inbound message to identify individual text of the inbound message, and providing the text to a list of rules to locate pertinent applications;
   computer usable program code for selecting at least one of the located pertinent applications that is internal to the customer service agent productivity suite or external to the customer service agent productivity suite;
   computer usable program code for providing an activatable reference to the at least one selected application in the agent user interface; and,
   computer usable program code for displaying the agent user interface to provide access to the at least one selected application through the activatable reference.

7. The computer program product of claim 6, wherein the computer usable program code for selecting at least one of the located pertinent applications, comprises computer usable program code for selecting both applications that are internal to the customer service agent productivity suit and applications that external to the customer service agent productivity suite from amongst the located pertinent applications.

8. The computer program product of claim 6, wherein the computer usable program code for providing an activatable reference to the at least one selected application in the agent user interface, comprises computer usable program code for providing an activatable tab for the at least one selected application in a tab control of the agent user interface.

9. The computer program product of claim 6, further comprising:
   computer usable program code for identifying text within the inbound message;
   computer usable program code for formatting the identified text as a hyperlink pointing to a Web page related to the identified text; and,
   computer usable program code for loading the Web page in a content browser.

\* \* \* \* \*